US007933245B2

(12) United States Patent
Carlton

(10) Patent No.: US 7,933,245 B2
(45) Date of Patent: Apr. 26, 2011

(54) MEDIA INDEPENDENT HANDOVER FOR MOBILITY

(75) Inventor: Alan Gerald Carlton, Mineola, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1136 days.

(21) Appl. No.: 11/463,748

(22) Filed: Aug. 10, 2006

(65) Prior Publication Data
US 2006/0291423 A1 Dec. 28, 2006

Related U.S. Application Data

(63) Continuation of application No. 11/091,159, filed on Mar. 28, 2005.

(60) Provisional application No. 60/569,015, filed on May 7, 2004.

(51) Int. Cl.
*H04W 4/00* (2009.01)

(52) U.S. Cl. ........ 370/331; 370/328; 370/329; 370/335; 370/338; 370/341; 370/348; 370/466; 370/467; 370/469; 455/436; 455/437

(58) Field of Classification Search .................. 370/328, 370/329, 331, 335, 338, 341, 342, 348, 466, 370/467, 469; 455/552.1, 435.2, 436–442
See application file for complete search history.

(56) References Cited

U.S. PATENT DOCUMENTS

| 5,889,816 A | 3/1999 | Agrawal et al. |
| 5,946,634 A | 8/1999 | Korpela |
| 6,393,008 B1 | 5/2002 | Cheng et al. |
| 6,587,680 B1 | 7/2003 | Ala-Laurila et al. |
| 6,651,105 B1 | 11/2003 | Bhagwat et al. |
| 6,771,962 B2 | 8/2004 | Saifullah et al. |
| 6,804,222 B1 | 10/2004 | Lin et al. |
| 6,826,406 B1 | 11/2004 | Vialen et al. |
| 6,879,568 B1 | 4/2005 | Xu et al. |
| 6,950,655 B2 | 9/2005 | Hunkeler |
| 6,963,745 B2 * | 11/2005 | Singh et al. .................. 455/437 |
| 6,985,465 B2 | 1/2006 | Cervello et al. |
| 7,016,325 B2 | 3/2006 | Beasley et al. |
| 7,031,280 B2 | 4/2006 | Segal |

(Continued)

FOREIGN PATENT DOCUMENTS

AU 2002/313192 12/2003

(Continued)

OTHER PUBLICATIONS

Kwak, Joe. "RRM Study Group: Big Picture Issues." Sep. 10, 2002. IEEE Submission, Document: IEEE 802.11-557r0.

(Continued)

*Primary Examiner* — William Trost, IV
*Assistant Examiner* — Toan D Nguyen
(74) *Attorney, Agent, or Firm* — Volpe and Koenig, P.C.

(57) ABSTRACT

A media independent handover (MIH) device communicates with an 802 technology medium access control (MAC) layer and an 802 technology physical (PHY) layer utilizing an 802 technology management entity (ME) device. Handover information messages are produced by the MIH device. The handover information messages facilitate handover. The 802 technology ME device facilitates encapsulation of the handover information messages. The 802 technology ME device is coupled to the 802 technology MAC layer and the 802 technology PHY layer. The encapsulated handover information messages is sent to other MIH devices messages via the 802 technology ME device.

48 Claims, 6 Drawing Sheets

U.S. PATENT DOCUMENTS

| | | | |
|---|---|---|---|
| 7,039,027 B2* | 5/2006 | Bridgelall | 370/329 |
| 7,106,714 B2 | 9/2006 | Spear et al. | |
| 7,280,505 B2 | 10/2007 | Chaskar et al. | |
| 7,483,984 B1 | 1/2009 | Jonker et al. | |
| 2002/0060995 A1 | 5/2002 | Cervello et al. | |
| 2002/0071404 A1 | 6/2002 | Park et al. | |
| 2002/0072382 A1 | 6/2002 | Fong et al. | |
| 2002/0147008 A1 | 10/2002 | Kallio | |
| 2002/0188723 A1 | 12/2002 | Choi et al. | |
| 2003/0007490 A1 | 1/2003 | Yi et al. | |
| 2003/0117978 A1 | 6/2003 | Haddad | |
| 2003/0133421 A1 | 7/2003 | Sundar et al. | |
| 2003/0139184 A1 | 7/2003 | Singh et al. | |
| 2003/0139784 A1 | 7/2003 | Morimoto et al. | |
| 2003/0193911 A1 | 10/2003 | Zhao et al. | |
| 2004/0002335 A1 | 1/2004 | Pan et al. | |
| 2004/0013102 A1 | 1/2004 | Fong et al. | |
| 2004/0029587 A1 | 2/2004 | Hulkkonen et al. | |
| 2004/0076179 A1 | 4/2004 | Kaminski et al. | |
| 2004/0102194 A1 | 5/2004 | Naghian et al. | |
| 2004/0116120 A1 | 6/2004 | Gallagher et al. | |
| 2004/0147223 A1 | 7/2004 | Cho | |
| 2004/0165594 A1 | 8/2004 | Faccin et al. | |
| 2004/0192294 A1 | 9/2004 | Pan et al. | |
| 2004/0202141 A1 | 10/2004 | Sinivaara et al. | |
| 2005/0018637 A1 | 1/2005 | Karoubalis et al. | |
| 2005/0083971 A1 | 4/2005 | Delaney et al. | |
| 2005/0157673 A1* | 7/2005 | Verma et al. | 370/328 |
| 2005/0165917 A1 | 7/2005 | Le et al. | |
| 2005/0185619 A1 | 8/2005 | Niemela et al. | |
| 2005/0227691 A1* | 10/2005 | Pecen et al. | 455/435.2 |
| 2005/0243755 A1 | 11/2005 | Stephens | |
| 2006/0140150 A1* | 6/2006 | Olvera-Hernandez et al. | 370/331 |
| 2006/0187882 A1* | 8/2006 | Kwak et al. | 370/331 |
| 2006/0259598 A1* | 11/2006 | Kim et al. | 709/222 |

FOREIGN PATENT DOCUMENTS

| | | |
|---|---|---|
| CA | 2 528 138 | 1/2005 |
| EP | 1349413 A1 | 10/2003 |
| JP | 2002-112347 | 4/2002 |
| JP | 2003-060647 | 2/2003 |
| JP | 2003-283507 | 10/2003 |
| WO | 02/23819 | 3/2002 |
| WO | 2002/023819 | 3/2002 |
| WO | 2003/105380 | 12/2003 |
| WO | 2004/004373 | 1/2004 |
| WO | 2004/014027 | 2/2004 |
| WO | 2004/077747 | 9/2004 |
| WO | 2005/057968 | 6/2005 |
| WO | 2005/107297 | 11/2005 |

OTHER PUBLICATIONS

Kwak, Joe. "RRM Study Group: Big Picture Issues." Sep. 10, 2002. IEEE Submission, Document: IEEE 802.11-557r1.
Paine, Richard. "Radio Resource Measurement Requirements and Issues." Oct. 19, 2002. IEEE Submission, Document: IEEE 802.11-02/508r10.
Kwak, Joe. "WLAN Handoff Scenarios: Example Handoffs with RRM Measurements and Network Assistance." Mar. 2003. IEEE Submission, Document: IEEE 802.11-03/225r0.
Gupta, Vivek. "IEEE P802.21 Media Independent Handover Service Draft Technical Requirements." Sep. 2004.
Sachs et al. "IEEE 802.21 Media Independent Handover—Generic Link Layer Concept." IEEE Submission, Sep. 9, 2004.
Paine, Richard. "Radio Resource Measurement Issues." Jan. 16, 2003. IEEE Submission, Document: IEEE 802.11-03/134r0.
Johnston, David. "IEEE 802 Handoff Executive Committee Study Group." May 2003. 802 Handoff ECSG Minutes.
Johnston, David. "802 Handoff Presentation to WNG." Jul. 2003. 00-03-0022-00-0000 Handoff WNG Presentation r3.
Williams, Michael Glenn. IEEE P802 Wired and Wireless LANs Handoff: Tentative Minutes of the IEEE P802 Handoff Executive Committee Study Group. Jul. 22, 2003. IEEE 802.11-03/319r0-0023.
Williams, Michael Glenn. IEEE P802 Wired and Wireless LANs Handoff: Tentative Minutes of the IEEE P802 Handoff Executive Committee Study Group. Jul. 24, 2003. IEEE 802.11-03/319r000-03-0028-00-0000.
Johnston, David. "802 Handoff ECSG EC Closing Report." Jul. 2003. IEEE 00-03-0029-04-0000 802 Handoff EC Closing Report.
Williams, Michael Glenn. IEEE P802 Wired and Wireless LANs Handoff: Tentative Minutes of the IEEE P802 Handoff Executive Committee Study Group. Sep. 8, 2003. IEEE 00-03-0032-00-0000.
Paine, Richard. "Radio Resource Measurement: 802 Handoff Measurement Considerations." Mar. 2003. IEEE 802.11-03/125r4.
Hong, Cheng. "3GPP WLAN Interworking update." Mar. 16, 2004. IEEE 802.11-04/254r0.
Park, Soohong Daniel. "Access Router Identifier (ARID) for supporting L3 mobility." Jul. 2004. IEEE 802.11-04/710r0.
Gupta, Vivek. "Global Network Neighborhood." May 2004. IEEE 802.21.
Gupta, Vivek. "Steps in Handoffs and Use Cases." May 2004. IEEE 802.21.
Park, Soohong Daniel. "Awareness of the handover to be distinguished from a L2 or L3." Mar. 2004. 21-04-0002-00-0000-awareness handover L2$L3.ppt.
Johnston, David. "802.21, L2 Triggers A Strawman Proposal." Mar. 2004. 802.21 IETF Mobopts r1.
Shyy, Dong-Jye. "IEEE P802.21 Media Independent Handover Service: Draft Technical Requirements." Mar. 18, 2004. IEEE802.21-04/00xx-00.
Williams, Michael Glenn. "IEEE P802 Wired and Wireless LANs Handoff: Tentative Minutes of the IEEE P802 Handoff Executive Committee Study Group." Jan. 13, 2004. 00-04-00XX-00-0000.
Williams, Michael Glenn. "IEEE P802 Wired and Wireless LANs Handoff: Tentative Minutes of the IEEE P802 Handoff Executive Committee Study Group." Jan. 14, 2004. 00-04-00XX-00-0000.
Williams, Michael Glenn. "IEEE P802 Wired and Wireless LANs Handoff: Tentative Minutes of the IEEE P802.21 Working Group." Mar. 18, 2004. 00-04-00XX-00-0000.
Gupta, Vivek. "Global Network Neighborhood." May 2004. IEEE 802.21.
Gupta, Vivek. "Steps in Handoffs and Use Cases." May 2004. IEEE 802.21.
Gupta, Vivek. IEEE P802.21 Media Independent Handover Mechanisms: Teleconference Meeting Minutes. Jun. 29, 2004. 21-04-0073-00-0000.
Gupta, Vivek. "IEEE P802.21 Media Independent Handover Service Draft Technical Requirements." Jul. 12, 2004. 21-04-0087-00-0000.
Faccin, Stefano M. "IEEE 802.21 Media Independent Handover." Jan. 10, 2004. 21-04-0169-03-0000.
"IEEE 802.21 MIHO: Media Independent Handover Functions and Services Specification." Mar. 14, 2004.
"IEEE 802.21 MIHO: Media Independent Handover Functions and Services Specification." Mar. 14, 2004. 21-05-0253-01-0000.
"Information technology—Telecommunications and information exchange between systems—Local and metropolitan area networks—Specific requirements—Part 11: Wireless LAN Medium Access Control (MAC) and Physical Layer (PHY) Specifications." Jun. 12, 2003. ANSI/IEEE Std 802.11, 1999 Edition (R2003).
Park, Soohong Daniel. "Awareness of the handover to be distinguished from a L2 or L3." Mar. 2004. IEEE P802.21 Handoff.
Johnston, David. "802.21 L2 Services for Handover Optimization." Mar. 2004. 802.21 IETF DNA r1.
Johnston, David. "802.21, L2 Triggers a Strawman Proposal." Mar. 2004. 802.21 IETF Mobopts r1.
Liu, Xiaoyu. 'Interaction between L2 and Upper Layers in IEEE 802.21. Mar. 4, 2004. 802.21 L2 Upper Layer Interaction r.
Johnston, David. "Architectural Elements of an 802 Handoff Solution." May 2003. 802 Handoff Archtecture Elements r1.
Johnston, David. "802 Handoff Call for Interest—An Expression of Interest." Mar. 2003. IEEE 802-03/xxxr1.
Williams, Michael Glenn. "IEEE P802 Wired and Wireless LANs Handoff: Tentative Minutes of the IEEE P802 Handoff Executive Committee Study Group." Nov. 10, 2003. 00-03-00XX-00-0000.
Williams, Michael Glenn. "IEEE P802 Wired and Wireless LANs Handoff: Tentative Minutes of the IEEE P802.21 Working Group." Mar. 16, 2004. 00-04-00XX-00-0000.

Williams, Michael Glenn. "IEEE P802 Wired and Wireless LANs Handoff: Tentative Minutes of the IEEE P802.21 Working Group." Mar. 18, 2004. 00-04-00XX-00-0000.

Johnston, David. "Handoff Scope Discussion Points." May 2003. 802 Handoff Scope Discussion.

Johnston, David. "Improved Stack Diagram" Mar. 12, 2003. IEEE C802.16REVd-04/XX.

Aboba; Bernard. "A Model for Context Transfer in IEEE 802." Apr. 6, 2002.

Arbaugh, William A. "Experimental Handoff Extension to Radius." Apr. 23, 2003.

Wu, Gang. "Fast handoff for Mobile IP and Link Layer Triggers." May 2003. P802-Handoff-03-xxxr0-ECSG.

Gupta, Vivek. "IEEE 802.21: A Generalized Model for Link Layer Triggers." Mar. 1, 2004.

Johnston, David. "802 Handoff ECSG EC Opening Plenary Report." Nov. 2003. 802 Handoff EC Opening Plenary Report r2.

Lin, Huai-An (Paul). "Handoff for Multi-interfaced 802 Mobile Devices." May 2003. IEEE P802 Handoff ECSG.

Lin, Huai-An (Paul). "IEEE P802 Handoff ECSG: Handoff for Multi-interfaced 802 Mobile Devices." May 12, 2003.

Kwak, Joe. "Handoff Functional Elements: An analysis of typical mobile systems." Nov. 11, 2002.

Tan, TK. "Wireless Interworking Group." Nov. 11, 2002. IEEE 802.11-xxx.

Natarajan, Nat. "Support of Layer 2 Triggers for Faster Handoffs." Nov. 10, 2003. IEEE P802.20-03/95.

Johnston, David. "IEEE 802 Handoff ECSG L2 Triggers." Jan. 2004. L2 Triggers dj r1.

Rajkumar, Ajay. "Mobile-Initiated Handoff Amongst Disparate WLAN and Cellular Systems." May 13, 2003.

Williams, Michael Glenn. "Media Independent Handover: Use Cases and Architecture Discussion Stimulus." Jan. 2004. IEEE 802.21.

"Draft Supplement to Standard for Telecommunications and Information Exchange Between Systems—LAN/MAN Specific Requirements—Part 11: Wireless Medium Access Control (MAC) and physical layer (PHY) specifications: Medium Access Control (MAC) Enhancements for Quality of Service (QoS)." May 2002. IEEE Std 802.11e/D3.0.

Lin, Paul. "Proposed Problem and Scope Statements for Handoff ECSG." May 2003. IEEE P802 Handoff ECSG.

Das, Kaustubh. "Scope and Proposed Work Items for the Handoff Group." May 2003. IEEE P802 Handoff ECSG.

Das, Kaustubh. "Scope and Proposed Work Items for the Handoff Group." May 2003. IEEE P802 Handoff ECSG.

Gupta, Vivek. "Steps in L2 and L3 Handoffs." Jan. 2004. IEE P802 Handoff ECSG.

Arbaugh, William A. "Experimental Handoff Extension of Radius." Apr. 23, 2003.

Aboba, Bernard. "A Model for Context Transfer in IEEE 802." Apr. 6, 2002.

Marks, Roger. "Handoff Mechanisms and their Role in IEEE 802 Wireless Standards." Oct. 9, 2002. IEEE T802.16-02/03.

Lee, Young J. "IEEE P802.11 Wireless LANs: The Strategy for interworking between WLAN and cdma2000." Nov. 10, 2003. IEEE 802.11-00/xxx.

Lee, Young J. "An Strategy for interworking between WLAN and cdma2000." Nov. 2003. IEEE 802.11-00/xxx.

Shyy, Dong-Jye. "IEEE 802.21 WG—Suggested Architectures for Different Handover Scenarios." Mar. 2004. IEEE 802.21-04/xxxr0.

Johnston, David. "802.21 L2.5 Model." Mar. 2004. 802.21 L2.5 Option r1.

"3$^{rd}$ Generation Partnership Project; Technical Specification Group Services and System Aspects; 3GPP system to Wireless Local Area Network (WLAN) interworking; System description (Release 6)." 3GPP TS 23.234 V6.0.0 (Mar. 2004).

"3$^{rd}$ Generation Partnership Project; Technical Specification Group Services and System Aspects; 3GPP system to Wireless Local Area Network (WLAN) interworking; System description (Release 6)." 3GPP TS 23.234 V6.3.0 (Dec. 2004).

"Unlicensed Mobile Access (UMA); Architecture (Stage 2)." UMA Architecture (Stage 2) R1.0.2. (Nov. 3, 2004).

Wu, John Chiung-Shien et al. "Intelligent Handoff for Mobile Wireless Internet." 2001.

Floroiu et al., "Seamless Handover in Terrestrial Radio Networks: A Case Study," IEEE Communication Magazine, vol. 41 Issue 11, pp. 110-116 (Nov. 2003).

Zhang et al., "Efficient mobility management for vertical handoff between WWAN and WLAN," IEEE Communications Magazine, vol. 41 Issue 11, pp. 102-108 (Nov. 2003).

Endler et al., "General Approaches for Implementing Seamless Handover," Proceedings of the 2$^{nd}$ International Workshop on Principles of Mobile Computing, (Oct. 30-31, 2002).

Sanmateu et al., "Seamless Mobility across IP Networks using Mobile IP," Computer Networks, vol. 40, pp. 181-190, (Sep. 2002).

Toh, "The Design and Implementation of a Hybrid Handover Protocol for Multi-Media Wireless LANs," Proceedings of the 1$^{st}$ Annual International Conference on Mobile Computing and Networking, pp. 49-61, (Nov. 1995).

Wu, John Chiung-Shien et al. "Intelligent Handoff for Mobile Wireless Internet.", (Jan./Feb. 2001).

Xhafa et al., "Reducing Handover Time in Heterogeneous Wireless Network," 58$^{th}$ IEEE Vehicular Technology Conference, vol. 4, pp. 2222-2226, (Oct. 2003).

"3$^{rd}$ Generation Partnership Project; Technical Specification Group Services and System Aspects; 3GPP system to Wireless Local Area Network (WLAN) interworking; System description (Release 6)." 3GPP TS 23.234 V6.0.0 (Mar. 2004).

"3$^{rd}$ Generation Partnership Project; Technical Specification Group Services and System Aspects; 3GPP system to Wireless Local Area Network (WLAN) interworking; System description (Release 6)." 3GPP TS 23.234 V6.3.0 (Dec. 2004).

"Draft Supplement to STANDARD FOR Telecommunications and Information Exchange Between Systems—LAN/MAN Specific Requirements—Part 11: Wireless Medium Access Control (MAC) and physical layer (PHY) specifications: Medium Access Control (MAC) Enhancements for Quality of Service (QoS)." May 2002. IEEE Std 802.11e/D3.0.

"IEEE 802.21 MIHO: Media Independent Handover Functions and Services Specification." Mar. 14, 2004.

"IEEE 802.21 MIHO: Media Independent Handover Functions and Services Specification." Mar. 14, 2004. 21-05-0253-01-0000.

"Information technology—Telecommunications and information exchange between systems—Local and metropolitan area networks—Specific requirements—Part 11: Wireless LAN Medium Access Control (MAC) and Physical Layer (PHY) Specifications." Jun. 12, 2003. ANSI/IEEE Std 802.11, 1999 Edition (R2003).

"Unlicensed Mobile Access (UMA); Architecture (Stage 2)." UMA Architecture (Stage 2) R1.0.2. (Nov. 3, 2011).

Aboba, Bernard. "A Model for Context Transfer in IEEE 802." Apr. 6, 2002.

Arbaugh, William A. "Experimental Handoff Extension of RADIUS." Apr. 23, 2003.

Das, Kaustubh. "Scope and Proposed Work Items for the Handoff Group." May 2003. IEEE P802 Handoff ECSG.

Faccin, Stefano M. "IEEE 802.21 Media Independent Handover." Jan. 10, 2004. 20-04-0169-03-0000.

Floroiu et al., "Seamless Handover in Terrestrial Radio Networks: A Case Study," IEEE Communication Magazine, vol. 41 Issue 11, pp. 110-116 (Nov. 2003).

Gupta, Vivek. "Global Network Neighborhood." May 2004. IEEE 802.21.

Gupta, Vivek. "IEEE 802.21: A Generalized Model for Link Layer Triggers." Mar. 1, 2004.

Gupta, Vivek. IEEE P802.21 Media Independent Handover Mechanisms: Teleconference Meeting Minutes. Jun. 29, 2004. 21-04-0073-00-0000.

Gupta, Vivek. "IEEE P802.21 Media Independent Handover Service Draft Technical Requirements." Sep. 2004.

Gupta, Vivek. "IEEE P802.21 Media Independent Handover Service Draft Technical Requirements." Jul. 12, 2004. 21-04-0087-00-0000.

Gupta, Vivek. "Steps in Handoffs and Use Cases." May 2004. IEEE 802.21.

Gupta, Vivek. "Steps in L2 and L3 Handoffs." Jan. 2004. IEE P802 Handoff ECSG.

Hong, Cheng. "3GPP WLAN Interworking update." Mar. 16, 2004. IEEE 802.11-04/254r0.

Johnston, David. "802 Handoff Call for Interest—An Expression of Interest." Mar. 2003. IEEE 802-03/xxxr1.

Johnston, David. "802 Handoff ECSG EC Closing Report." Jul. 2003. IEEE 00-03-0029-04-0000 802 Handoff EC Closing Report.

Johnston, David. "802 Handoff ECSG EC Opening Plenary Report." Nov. 2003. 802 Handoff EC Opening Plenary Report r2.

Johnston, David. "802 Handoff Presentation to WNG." Jul. 2003. 00-03-0022-00-0000 Handoff WNG Presentation r3.

Johnston, David. "802.21 L2 Services for Handover Optimization." Mar. 2004. 802.21 IETF DNA r1.

Johnston, David. "802.21 L2.5 Model." Mar. 2004. 802.21 L2.5 Option r1.

Johnston, David. "802.21, L2 Triggers A Strawman Proposal." Mar. 2004. 802.21 IETF Mobopts r1.

Johnston, David. "Architectural Elements of an 802 Handoff Solution." May 2003. 802 Handoff Archtecture Elements r1.

Johnston, David. "Handoff Scope Discussion Points." May 2003. 802 Handoff Scope Discussion.

Johnston, David. "IEEE 802 Handoff ECSG L2 Triggers." Jan. 2004. L2 Triggers dj r1.

Johnston, David. "IEEE 802 Handoff Executive Committee Study Group." May 2003. 802 Handoff ECSG Minutes.

Johnston, David. "Improved Stack Diagram" Mar. 12, 2003. IEEE C802.16REVd-04/XX.

Kwak, Joe. "Handoff Functional Elements: An analysis of typical mobile systems." Nov. 11, 2002.

Kwak, Joe. "RRM Study Group: Big Picture Issues." Sep. 10, 2002. IEEE Submission, Document: IEEE 802.11-557r0.

Kwak, Joe. "RRM Study Group: Big Picture Issues." Sep. 10, 2002. IEEE Submission, Document: IEEE 802.11-557r1.

Kwak, Joe. "WLAN Handoff Scenarios: Example Handoffs with RRM Measurements and Network Assistance." Mar. 2003. IEEE Submission, Document: IEEE 802.11-03/225r0.

Lee, Young J. "An Strategy for interworking between WLAN and cdma2000." Nov. 2003. IEEE 802.11-00/xxx.

Lee, Young J. "IEEE P802.11 Wireless LANs: The Strategy for interworking between WLAN and cdma2000." Nov. 10, 2003. IEEE 802.11-00/xxx.

Lin, "QoS Aware Handover Scheme for the New Generation Wireless Networks," (Jul. 2002) available at http://thesis.lib.ncu.edu.tw/ETD-db/ETD-search/view_etd?URN=89522005 (last visited Aug. 21, 2008).

Lin, Huai-An (Paul). "Handoff for Multi-interfaced 802 Mobile Devices." May 2003. IEEE P802 Handoff ECSG.

Lin, Huai-An (Paul). "IEEE P802 Handoff ECSG: Handoff for Multi-interfaced 802 Mobile Devices." May 12, 2003.

Lin, Paul. "Proposed Problem and Scope Statements for Handoff ECSG." May 2003. IEEE P802 Handoff ECSG.

Liu, Xiaoyu. Interaction between L2 and Upper Layers in IEEE 802.21. Mar. 4, 2004. 802.21 L2 Upper Layer Interaction r.

Marks, Roger. "Handoff Mechanisms and their Role in IEEE 802 Wireless Standards." Oct. 9, 2002. IEEE T802.16-02/03.

Natarajan, Nat. "Support of Layer 2 Triggers for Faster Handoffs." Nov. 10, 2003. IEEE P802.20- 03/95.

Paine, Richard. "Radio Resource Measurement Issues." Jan. 16, 2003. IEEE Submission, Document: IEEE 802.11-03/134r0.

Paine, Richard. "Radio Resource Measurement Requirements and Issues." Oct. 19, 2002. IEEE Submission, Document: IEEE 802.11-02/508r10.

Paine, Richard. "Radio Resource Measurement: 802 Handoff Measurement Considerations." Mar. 2003. IEEE 802.11-03/125r4.

Park, Soohong Daniel. "Access Router Identifier (ARID) for supporting L3 mobility." Jul. 2004. IEEE 802.11-04/710r0.

Park, Soohong Daniel. "Awareness of the handover to be distinguished from a L2 or L3." Mar. 2004. 21-04-0002-00-0000-awareness handover L2$L3.ppt.

Park, Soohong Daniel. "Awareness of the handover to be distinguished from a L2 or L3." Mar. 2004. IEEE P802.21 Handoff.

Rajkumar, Ajay. "Mobile-Initiated Handoff Amongst Disparate WLAN and Cellular Systems." May 13, 2003.

Sachs et al. "IEEE 802.21 Media Independent Handover—Generic Link Layer Concept." IEEE Submission, Sep. 9, 2004.

Shyy, Dong-Jye. "IEEE 802.21 WG—Suggested Architectures for Different Handover Scenarios." Mar. 2004. IEEE 802.21-04/xxxr0.

Shyy, Dong-Jye. "IEEE P802.21 Media Independent Handover Service: Draft Technical Requirements." Mar. 18, 2004. IEEE802.21-04/00xx-00.

Tan, TK. "Wireless Interworking Group." Nov. 11, 2002. IEEE 802.11-xxx.

Williams, Michael Glenn. "IEEE P802 Wired and Wireless LANs Handoff: Tentative Minutes of the IEEE P802 Handoff Executive Committee Study Group." Jan. 13, 2004. 00-04-00XX-00/0000.

Williams, Michael Glenn. "IEEE P802 Wired and Wireless LANs Handoff: Tentative Minutes of the IEEE P802 Handoff Executive Committee Study Group." Jan. 14, 2004. 00-04-00XX-00-0000.

Williams, Michael Glenn. "IEEE P802 Wired and Wireless LANs Handoff: Tentative Minutes of the IEEE P802.21 Working Group." Mar. 18, 2004. 00-04-00XX-00-0000.

Williams, Michael Glenn. "IEEE P802 Wired and Wireless LANs Handoff: Tentative Minutes of the IEEE P802 Handoff Executive Committee Study Group." Nov. 10, 2003. 00-03-00XX-00-0000.

Williams, Michael Glenn. "IEEE P802 Wired and Wireless LANs Handoff: Tentative Minutes of the IEEE P802.21 Working Group." Mar. 16, 2004. 00-04-00XX-00-0000.

Williams, Michael Glenn. "IEEE P802 Wired and Wireless LANs Handoff: Tentative Minutes of the IEEE P802.21 Working Group." Mar. 18, 2004. 00-04-00XX-00-0000.

Williams, Michael Glenn. "Media Independent Handover: Use Cases and Architecture Discussion Stimulus." Jan. 2004. IEEE 802.21.

Williams, Michael Glenn. IEEE P802 Wired and Wireless LANs Handoff: Tentative Minutes of the IEEE P802 Handoff Executive Committee Study Group. Jul. 22, 2003. IEEE 802.11-03/319r000-03-0028-00-0000.

Williams, Michael Glenn. IEEE P802 Wired and Wireless LANs Handoff: Tentative Minutes of the IEEE P802 Handoff Executive Committee Study Group. Jul. 24, 2003. IEEE 802.11-03/319r000-03-0028-00-0000.

Williams, Michael Glenn. IEEE P802 Wired and Wireless LANs Handoff: Tentative Minutes of the IEEE P802 Handoff Executive Committee Study Group. Sep. 8, 2003. IEEE 00-03-0032-00-0000.

Wu, Gang. "Fast handoff for Mobile IP and Link Layer Triggers." May 2003. P802-Handoff-03-xxxrO-ECSG.

Zhang et al., "Efficient mobility management for vertical handoff between WWAN and WLAN,, " IEEE Communications Magazine, vol. 41 Issue 11, pp. 102-108 (Nov. 2003)

* cited by examiner

MEDIA INDEPENDENT HANDOVER FOR MOBILITY

CROSS REFERENCE TO RELATED APPLICATIONS

This application is a continuation of U.S. patent application Ser. No. 11/091,159 filed on Mar. 28, 2005 which claims the benefit of U.S. Provisional Application No. 60/569,015, filed May 7, 2004, which is incorporated by reference as if fully set forth herein.

FIELD OF INVENTION

The present invention generally relates to wireless communication systems, and more particularly, to a method and system for implementing a media independent handover between different wireless network types.

BACKGROUND

Typical mobile systems have two main operating modes: Idle mode and Connected mode. In Idle mode, the station (STA) characteristics include: no user service (i.e., no call or transaction in progress); monitoring of paging channels; available service request channels; 100% of the receiver is available for downlink measurements of the radio environment; background coordination; and unscheduled access point (AP) and/or technology reselection. In Connected mode, the STA characteristics include: an active user service (e.g., a call is in progress); handover is possible; limited receiver availability for measurements (since the user service takes priority); and fully coordinated, scheduled AP and/or technology handover.

Prior to entering Idle mode (e.g., at power-up), the STA must perform selection in order to determine the best AP and technology available for the requested user service. While in the Idle mode, the STA continuously examines neighboring APs and APs with different technologies. Upon determination of a "better" AP, the STA will transition over (i.e., perform "reselection") to the new AP.

While in the Connected mode, a handover occurs upon transition from one AP to another AP offering "better" service, including switching to an AP using a different technology. In an ideal case, handover occurs without noticeable interruption of the active user service.

One goal is to achieve a seamless handover (i.e., to permit mobility of a STA) between different wireless network types, such as between different wireless local area network (WLAN) types or between a WLAN and a cellular system. Current technology does not provide for this type of handover.

FIG. 1 is a diagram of an existing cellular mobility model 100, showing a centralized radio resource management (RRM) approach to the mobility issue. A cellular STA 102 (e.g., a 2G mobile station or a 3G user equipment) is freely mobile among a plurality of APs 104. The APs 104 can include, but are not limited to, GSM base stations and FDD/CDMA Node Bs. The APs 104 are connected together via a radio network 106. A handover policy function (HPF) 108 is used to direct the handover of the STA 102 among the APs 104 as the STA 102 moves about. The HPF 108 is centrally located (e.g., in a 2G base station controller (BSC) or a 3G radio network controller (RNC)) and is connected to a network 110 (e.g., a switch or a server).

The HPF 108 provides coordination as the STA 102 moves about the different APs 104. The STA 102 sends measurements to the HPF 108, and the HPF 108 makes the final decision regarding handover and which AP 104 the STA 102 should be on.

In the model 100, semi-static frequency assignments are made to each AP 104 and some radio planning is required. In Idle mode, both intra-technology (e.g., GSM to GSM) and inter-technology (e.g., GSM to FDDIWCDMA) AP selection/reselection decisions are made in the STA 102 and are supported by system information (from the network 110) broadcast by the HPF 108. In Connected mode, AP handover decisions are made in the HPF 108 and are supported by measurements made by the STA 102 that are sent to the HPF 108 via L3 signaling.

FIG. 2 is a diagram of an existing WLAN mobility model 200, showing a distributed RRM approach to the mobility issue. An 802.x STA 202 is freely mobile among a plurality of APs 204, which can include, but are not limited to 802.11a and 802.16 APs. The APs 204 communicate via a radio network 206 and to a network 208 (e.g., a gateway or router).

In the model 200, dynamic frequency assignments are made to each AP 204 and radio planning is not required. The only type of handover supported in the mobility model 200 is an intra-technology (e.g., 802.11a to 802.11a) Idle mode handover, where the AP selection/reselection decision is made autonomously in the STA 202. The other handover types (Idle mode with inter-technology and Connected mode) are not supported in the mobility model 200.

In this distributed RRM approach, the APs 204 can be deployed anywhere and they dynamically manage themselves. There is no centralized point through which RRM is performed, and therefore, no element in the architecture to execute a handover.

FIG. 3 is a diagram of existing mobile system architectures for cellular and WLAN network types. A GPRS (2G) STA 300 includes a physical layer 302, a data link layer 304, and a network layer 306. The data link layer 304 includes a medium access control (MAC) sublayer 310 and a radio link control (RLC) sublayer 312. The network layer 306 includes a GSM radio resource (RR) manager 314, a mobility management (MM) protocol manager 316, and an Internet Protocol (IP)/convergence manager 318.

A 3GPP (3G) STA 320 includes a physical layer 322, a data link layer 324, and a network layer 326. The data link layer 324 includes a MAC sublayer 330 and a RLC sublayer 332. The network layer 326 includes a 3G RR controller 334, a MM protocol manager 336, and an IP/convergence manager 338.

An 802.xx STA 340 includes a physical layer 342, a data link layer 344, and a network layer 346. The data link layer 344 includes a MAC sublayer 350 and a logical link (LLC) sublayer 352. The network layer 346 includes a mobile IP manager 354 and an IP/convergence manager 356.

The RR manager/controller (314, 334) manages the instantaneous radio link, handling all of the information regarding a radio link. The MM protocol (316, 336, 354) handles network level issues, such as registration and location updating as the STA moves about the system (i.e., issues outside of the call itself).

Current WLAN systems offer only a limited mobility capability. Intra-technology (e.g., 802.11 to 802.11) and inter-technology (e.g., 802.11 to 802.16) user transitions are supported using a "break before make" strategy that can be characterized as a reselection operation, as opposed to a handover operation in a typical full mobility system (e.g., GSM). This problem limits the growth of WLAN technologies, as this approach is unsatisfactory for supporting real time services such as voice and video streaming.

SUMMARY

A media independent handover (MIH) device communicates with an 802 technology medium access control (MAC) layer and an 802 technology physical (PHY) layer utilizing an 802 technology management entity (ME) device. Handover information messages are produced by the MIH device. The handover information messages facilitate handover. The 802 technology ME device facilitates encapsulation of the handover information messages. The 802 technology ME device is coupled to the 802 technology MAC layer and the 802 technology PHY layer. The encapsulated handover information messages is sent to other MIH devices messages via the 802 technology ME device.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Hereafter, the term "station" (STA) includes, but is not limited to, a wireless transmit/receive unit, a user equipment, a fixed or mobile subscriber unit, a pager, or any other type of device capable of operating in a wireless environment. When referred to hereafter, the term "access point" (AP) includes, but is not limited to, a base station, a Node B, a site controller, or any other type of interfacing device in a wireless environment.

Figure 1:
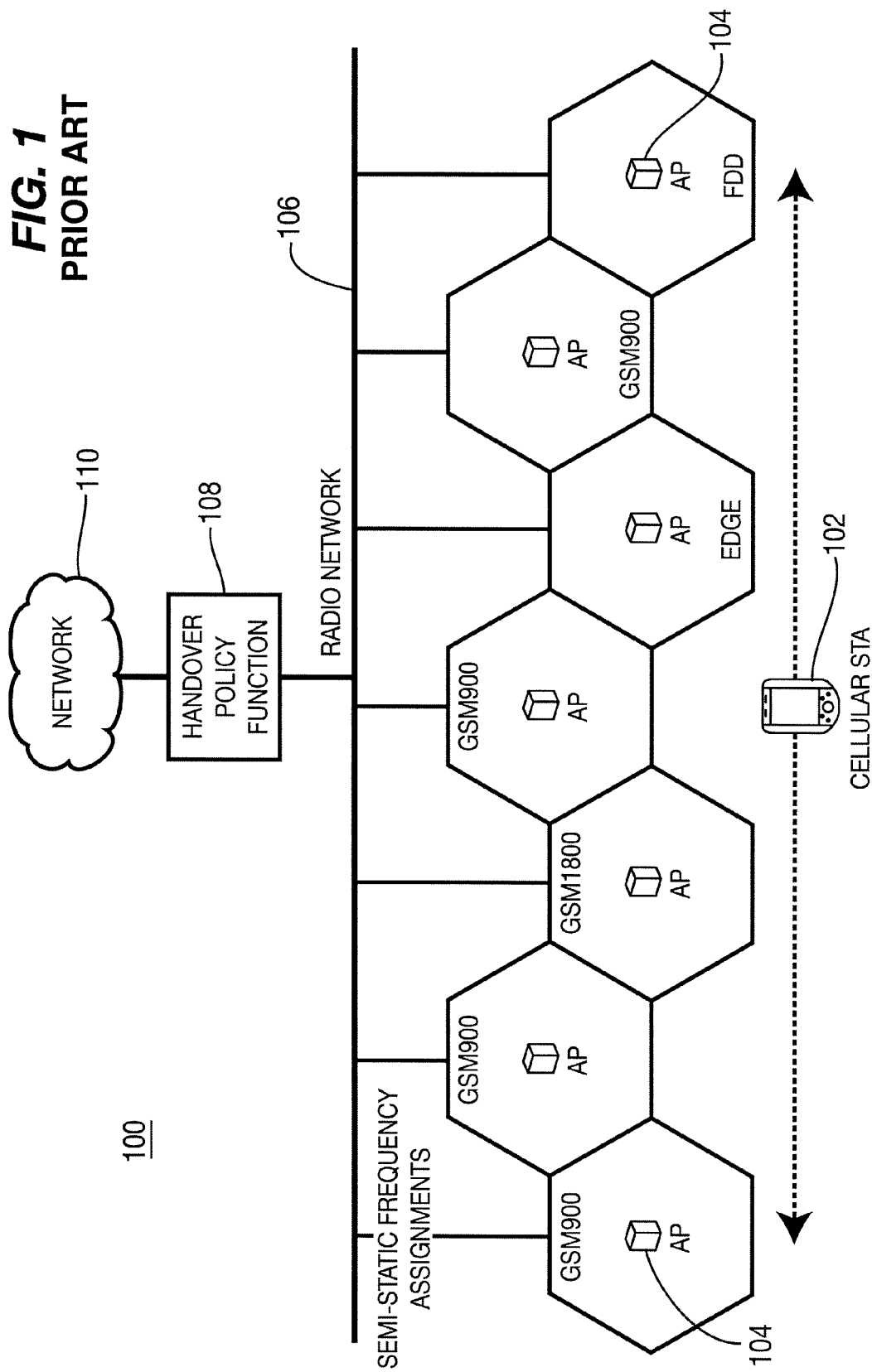
FIG. 1 is a diagram of an existing cellular mobility model.
Figure 2:
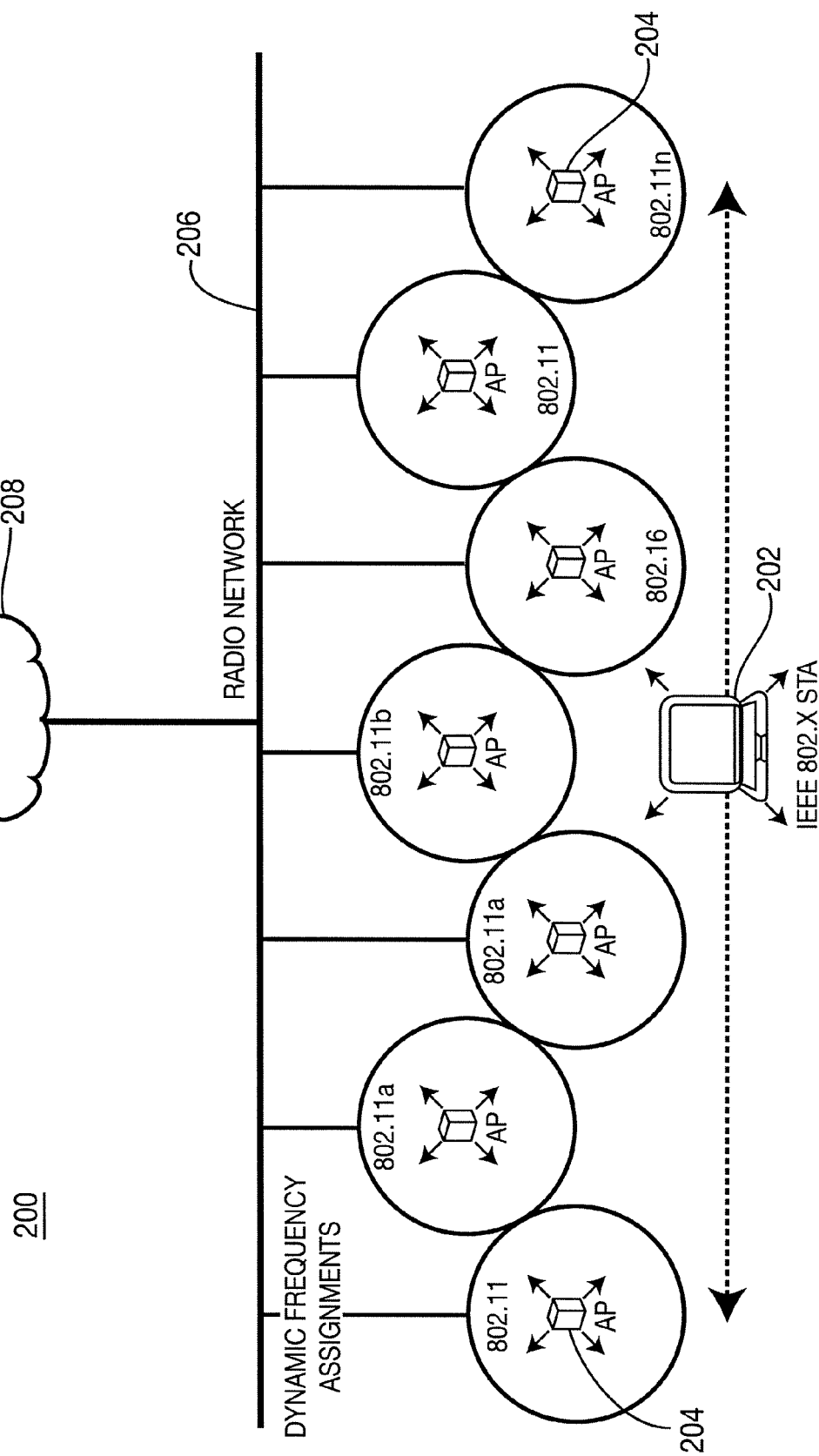
FIG. 2 is a diagram of an existing WLAN mobility model.
Figure 3:
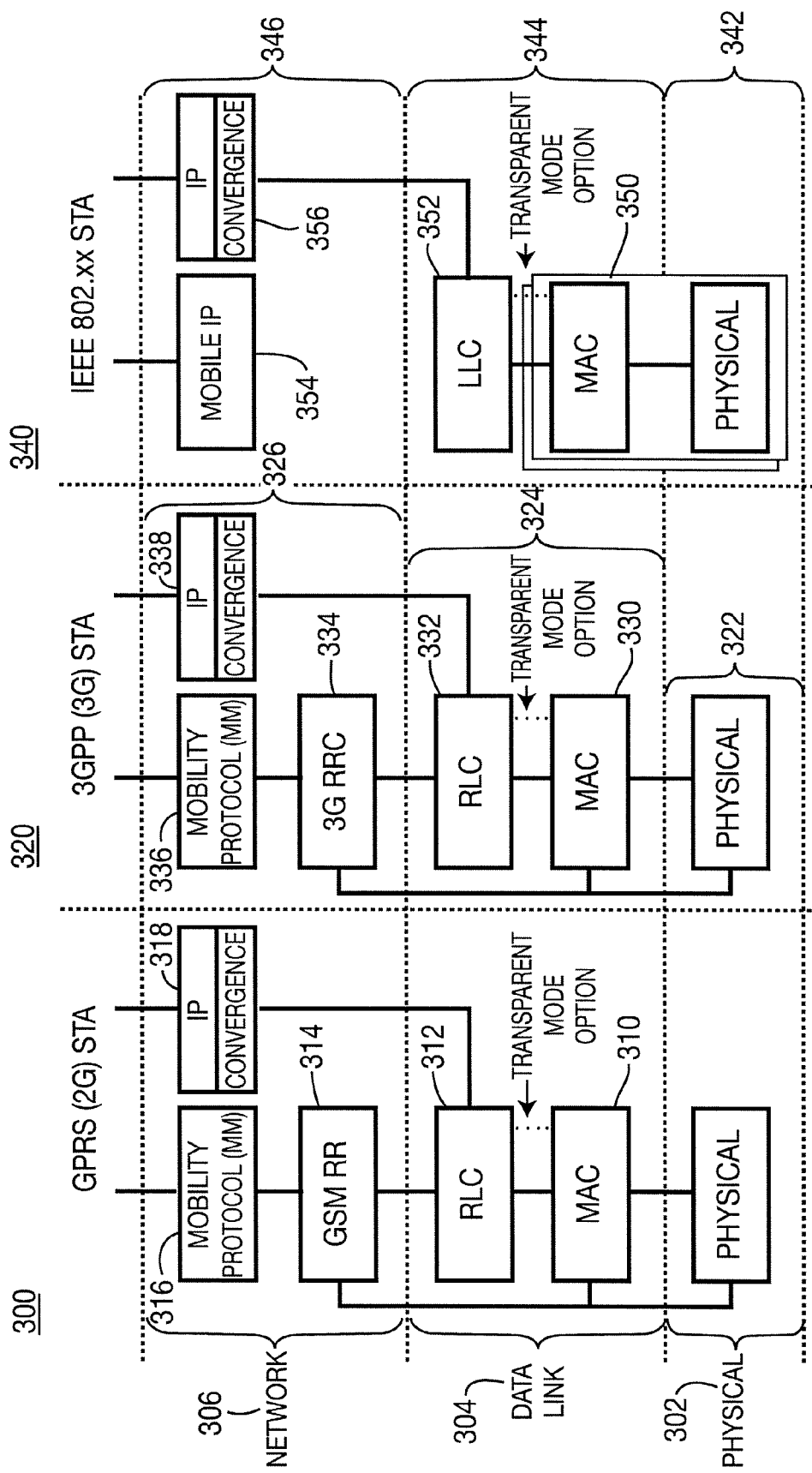
FIG. 3 is a diagram of existing mobile system architectures for cellular and WLAN network types.
Figure 4:
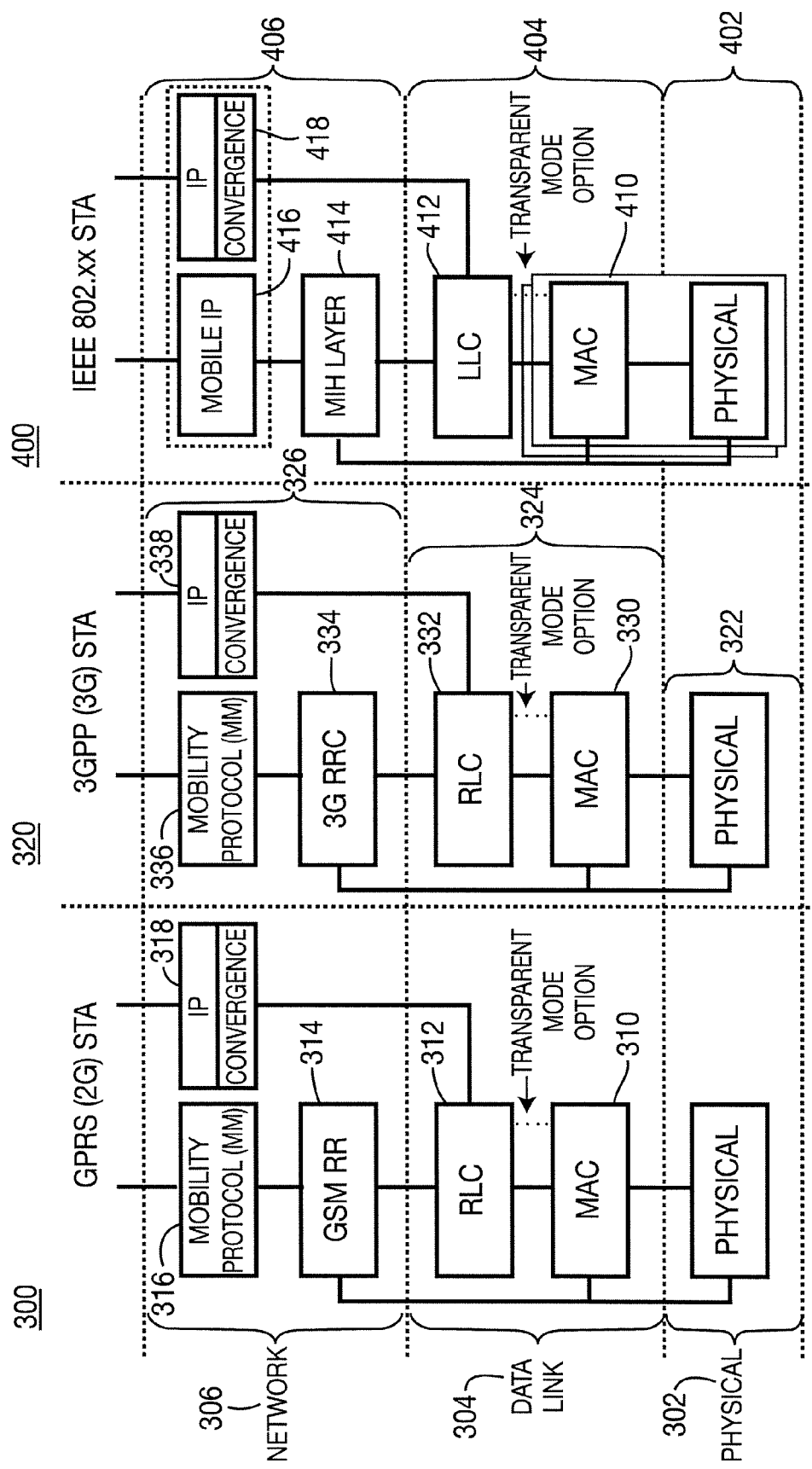
FIG. 4 is a diagram of a mobility architecture in a WLAN in accordance with the present invention and how it compares to cellular network types.

FIG. 4 is a diagram of a mobility architecture in a WLAN and how it compares to cellular network types. The GPRS STA 300 and the 3GPP STA 320 are identical to the STAs described above in connection with FIG. 3. An 802.xx STA 400 includes a physical layer 402, a data link layer 404, and a network layer 406. The data link layer 404 includes a MAC sublayer 410 and a LLC sublayer 412. The network layer 406 includes a media independent handover layer 414, a mobile IP manager 416, and an IP/convergence manager 418. The remainder of the discussion focuses on the media independent handover (MIH) layer 414 and how it operates within a mobility model. The MIH layer 414 performs functions similar to the GSM RR 314 and the 3G RRC 334.

Figure 5:
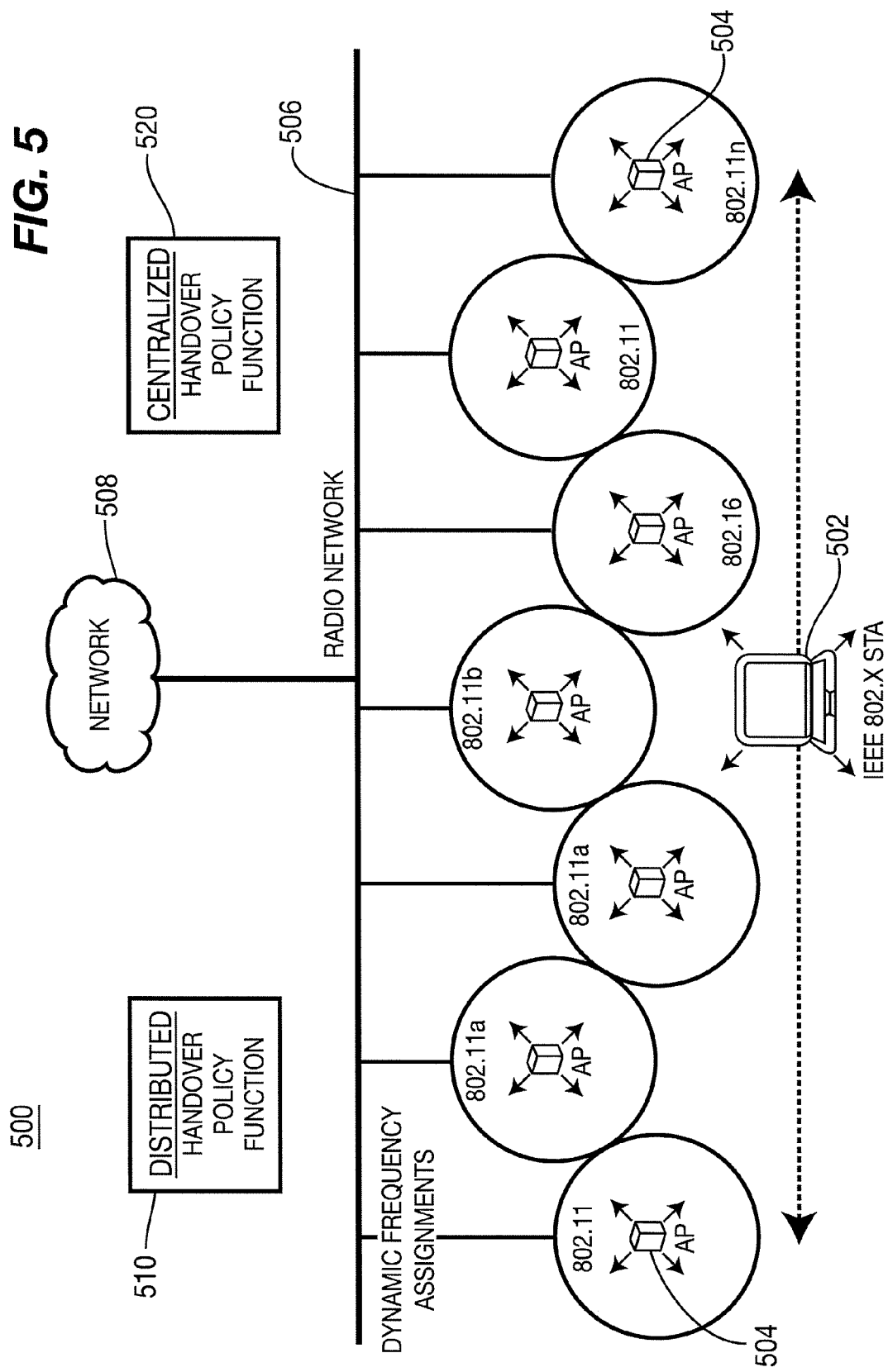
FIG. 5 is a diagram of a WLAN mobility model in accordance with the present invention.

FIG. 5 is a diagram of a WLAN mobility model 500 in accordance with the present invention, showing two basic HPF options, distributed and centralized. These options relate to the situations not previously addressed by mobility models, i.e., Idle mode with inter-technology handover and Connected mode handover.

An 802.x STA 502 is freely mobile among a plurality of APs 504, which can include, but are not limited to 802.11a and 802.16 APs. The APs 504 communicate via a radio network 506 and to a network 508 (e.g., a gateway or router).

The model 500 can implement a distributed HPF 510 at the STA 502 and/or a centralized HPF 520 at the network 508.

In a distributed HPF setting, the STA makes the selection, reselection, and handover decisions autonomously. This includes Idle mode, inter-technology selection/reselection and both Connected mode handover types.

In a centralized HPF setting, the HPF located on the system side assists in the selection and reselection processes, and makes the handover decisions supported by information gathered by the STA. The information is communicated from the STA to the HPF via the signaling mechanisms of the present invention (i.e., the MIH layer). This includes Idle mode, inter-technology selection/reselection and both Connected mode handover types.

Figure 6:
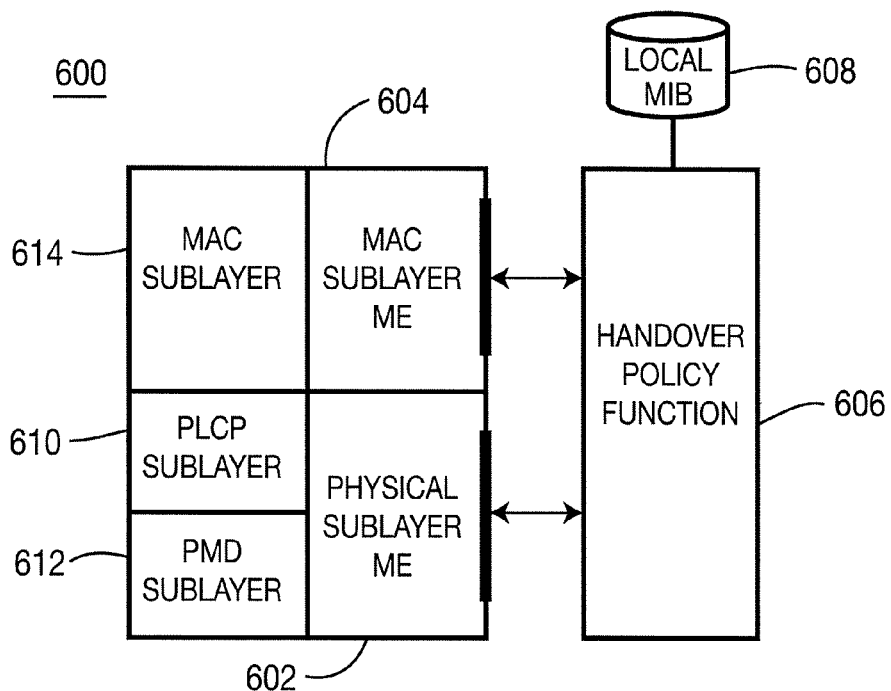
FIG. 6 is a diagram showing construction of a STA architecture to implement a distributed handover policy function of the present invention.

FIG. 6 is a block diagram of a functional architecture for a STA 600 utilizing the distributed HPF of the present invention. The STA 600 includes a physical sublayer management entity (ME) 602 and a MAC sublayer ME 604. A HPF 606 communicates with both the physical sublayer ME 602 and the MAC sublayer ME 604. A local management information base 608 stores information accessed by the HPF 606 in making the handover decision. The physical sublayer ME 602 includes a physical layer convergence procedure (PLCP) sublayer 610 and a physical medium dependant (PMD) sublayer 612. The MAC sublayer ME 604 includes a MAC sublayer 614.

Reselection and handover decisions are made autonomously by the STA 600. The HPF 606 receives measurements and other events (information typically used in making a handover decision) from the MAC sublayer ME 604 and the physical sublayer ME 602. The HPF 606 processes this information and makes an autonomous decision whether to perform a handover.

This is a limited handover solution, and is really just an extension of the reselection procedure and would be characterized as such in a typical mobile system. This is an adequate, but sub-optimal solution, mainly due to the use of a "break then make" strategy. With this strategy, when a STA knows that its radio link is deteriorating, it breaks the current link or the link independently fails before the new link is established. The resource availability to complete the handover is not guaranteed, and could lead to dropped calls of the new AP lacks the resources to accommodate the handover. The possibility of dropped calls is an adequate solution for non-real time services, but is an unacceptable solution for real time services such as voice communications. Furthermore, this is a poorly scalable solution, for the same reasons; i.e., as more STAs are added to the system, the performance will deteriorate.

Figure 7:
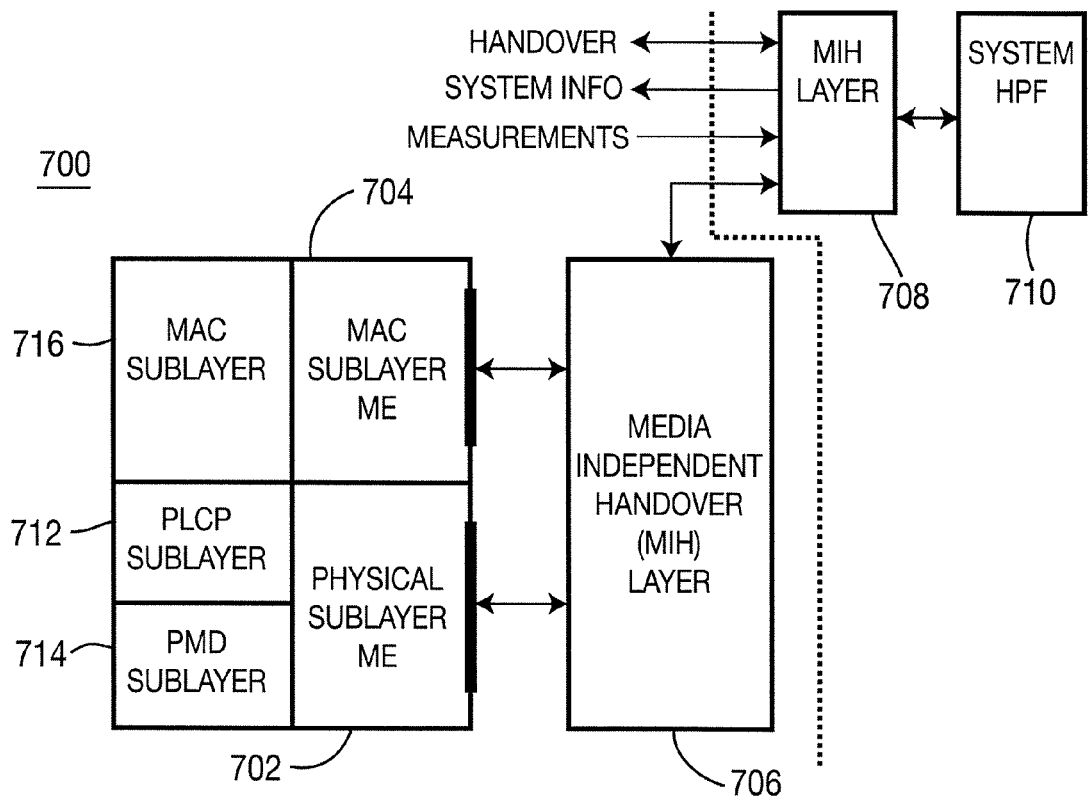
FIG. 7 is a diagram showing construction of a STA architecture to implement a centralized handover policy function of the present invention.

FIG. 7 is a block diagram of a functional architecture for a STA 700 utilizing the centralized HPF. The STA 700 includes a physical sublayer ME 702 and a MAC sublayer ME 704. A media independent handover (MIH) layer 706 communicates with both the physical sublayer ME 702 and the MAC sublayer ME 704. The MIH layer 706 communicates with a MIH layer 708 on the system side. The MIH layer 708 communicates with a system HPF 708. The physical sublayer ME 702 includes a PLCP sublayer 712 and a PMD sublayer 714. The MAC sublayer ME 704 includes a MAC sublayer 716.

The MIH layer 706 and the system HPF 710 communicate via the MIH layer 708. The MIH layer 706 sends measurements to the HPF 710 and the HPF 710 sends system information to the MIH layer 706. The reselection and handover decisions are coordinated between the MIH layer 706 and the HPF 710 based on this exchange of information. This use of both the MIH layer 706, the MIH layer 708, and the HPF 710 is analogous to a cellular system type of handover.

Reselection and handover decisions are coordinated by the HPF 710 and are supported by measurement reports and system signaling received via the MIH layers 706, 708. This is a fast, optimal handover solution due to the centralized decision-making which uses a make then break strategy, guaranteeing resource availability to complete the handover. This is an adequate solution for non-real time services, an acceptable solution for real time services, and is easily scalable, providing a full mobility solution.

In order to support a full mobility solution, both a mobility protocol (e.g., MM, mobile IP, SIP, etc.) and a resource control protocol (e.g., RRC or MIH layer) are required. The mobility protocol supports functions such as discovery, registration, tunneling, termination (or paging), handover at the network level (between two switches), and security. The resource control protocol supports functions such as system information, termination (or paging), cell selection/reselection, establishment, release, measurement reporting, power control, and handover at the radio level (between two radios). Handover support provided at both levels is required to support a full mobility solution.

On the network side, both the MIH layer 708 and the HPF 710 can be positioned in any centralized entity, such as an AP, a server, a database, or a router. In a preferred embodiment, the MIH layer 708 and the HPF 710 are located in an AP or an AP controller. The MIH layer 708 and the HPF 710 are separate logical entities. The MIH layer 708 acts as a state machine, gathering the necessary information and passing it to the HPF 710. The HPF 710 makes the handover decision based upon the information received.

While the present embodiment has been described in terms of a WLAN, the principles of the present embodiment are equally applicable to any type of wireless communication system. The centralized HPF architecture can be extended to support wireless to wired interworking scenarios, such as a handover policy when connecting a wireless device to a wireline system. An example of this would be using an 802.11-enabled laptop and then docking the laptop and using handover to take advantage of an Ethernet connection to the laptop docking station.

Although the elements shown in FIGS. 6 and 7 are illustrated as separate elements, these elements may be implemented on a single integrated circuit (IC), such as an application specific integrated circuit (ASIC), multiple ICs, discrete components, or a combination of discrete components and IC(s). In certain implementations, the functionality of embodiments and features of the invention may be present in discrete component(s)/IC(s) and may be partially/totally disabled or deactivated.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A wireless station comprising:
a media independent handover (MIH) device configured to produce handover information messages; and
an Institute of Electrical and Electronics Engineers (IEEE) 802.xx management entity (ME) device coupled to the MIH device, the IEEE 802.xx ME device coupled to an IEEE 802.xx medium access control (MAC) layer device and an IEEE 802.xx physical (PHY) layer device, and an IEEE 802.xx management ME device configured to process handover information messages produced by the MIH device;
wherein the MIH device is further configured to communicate with the IEEE 802.xx MAC layer device and the IEEE 802.xx PHY layer device via the IEEE 802.xx management ME device, and to send the handover information messages to another MIH device,
wherein the IEEE 802.xx ME device comprises:
a MAC ME device configured to communicate with the IEEE 802.xx MAC layer device; and
a PHY ME device configured to communicate with the IEEE 802.xx PHY layer device;
wherein the MIH device is further configured to communicate with at least one of the MAC ME device or the PHY ME device.

2. The station of claim 1 wherein the station is configured to handover from an IEEE 802.xx technology to a cellular technology in response to the information provided by the MIH device to facilitate handover.

3. The station of claim 1 wherein the MIH device is configured to communicate with technologies other than IEEE 802.xx technologies.

4. The station of claim 1 wherein the IEEE 802.xx ME device, the IEEE 802.xx MAC device, and the IEEE 802.xx PHY device operate in accordance with an IEEE 802.11 technology or an IEEE 802.16 technology.

5. The station of claim 1 further comprising:
a cellular device configured to communicate with a cellular network according to a cellular technology, wherein the cellular technology is a Global System for Mobile communication (GSM), General Packet Radio Service (GPRS) or Third Generation (3G) technology.

6. The station of claim 1 wherein the MIH device is configured as a sublayer between layer 2 and layer 3.

7. The station of claim 1 wherein the MIH device is coupled to layer 3.

8. The wireless station of claim 1, wherein
the media independent handover (MIH) device is further configured to transmit mobility protocol information and resource control protocol information.

9. The wireless station of claim 8, wherein the MIH component is further configured to communicate with an IEEE 802.xx logical link control (LLC) component in the wireless station.

10. The wireless station of claim 8, wherein the mobility protocol information includes a handover command and wherein the wireless station is further configured to perform handover from a first network to a second network in response to the handover command.

11. The wireless station of claim 10, wherein the first network is a cellular network and the second network is an IEEE 802.xx network.

12. The wireless station of claim 10, wherein the first network is an IEEE 802.xx network and the second network is a cellular network.

13. The wireless station of claim 10, wherein the first network is an IEEE 802.xx network and the second network is an IEEE 802.xx network.

14. The wireless station of claim 13, wherein the first network is an IEEE 802.16 network and the second network is an IEEE 802.11 network.

15. The wireless station of claim 13, wherein the first network is an IEEE 802.11 network and the second network is an IEEE 802.16 network.

16. The wireless station of claim 8, wherein the MIH component is configured to transmit mobility protocol information and resource control protocol information to a handover policy function (HPF) of a network infrastructure component.

17. The wireless station of claim 16, wherein the MIH component is further configured to transmit measurement information to the HPF.

18. The wireless station of claim 16, wherein the network infrastructure component is a component in a wireless network.

19. A method for use by a wireless station, the method comprising:
communicating, by a media independent handover (MIH) device, with a medium access control (MAC) management entity (ME) device and a physical (PHY) ME device of an Institute of Electrical and Electronics Engineers (IEEE) 802.xx ME device, wherein the MAC ME device of the IEEE 802.xx ME device is configured to communicate with a IEEE 802.xx MAC layer device, and the PHY ME device of the IEEE 802.xx ME device is configured to communicate with a IEEE 802.xx PHY layer device;
producing handover information messages by the MIH device;
processing the handover information messages by the IEEE 802.xx ME device; wherein the IEEE 802.xx ME device being coupled to the IEEE 802.xx MAC layer device and the IEEE 802.xx PHY layer device; and
sending the handover information messages to another MIH device via the IEEE 802.xx ME device.

20. The method of claim 19 wherein the station performs a handover from an IEEE 802.xx technology to a cellular technology in response to the information provided by the MIH device to facilitate handover.

21. The method of claim 19 wherein the MIH device communicates with technologies other than IEEE 802.xx technologies.

22. The method of claim 19 wherein the IEEE 802.xx ME device, the IEEE 802.xx MAC device, and the IEEE 802.xx PHY device operate in accordance with an IEEE 802.11 technology or an IEEE 802.16 technology.

23. The method of claim 19 wherein the MIH device is a sublayer between layer 2 and layer 3.

24. The method of claim 19 wherein the MIH device communicates directly with layer 3.

25. The method of claim 19 further comprising:
transmitting measurement information from the MIH device;
receiving, at the MIH device, a handover command; and
performing a make-then-break handover from a first wireless network to a second wireless network.

26. The method of claim 25, further comprising:
communicating, via the MIH component, with an IEEE 802.xx logical link control (LLC) component.

27. The method of claim 25, wherein the first network is a cellular network and the second network is an IEEE 802.xx network.

28. The method of claim 25, wherein the first network is an IEEE 802.xx network and the second network is a cellular network.

29. The method of claim 25, wherein the first network is an IEEE 802.xx network and the second network is an IEEE 802.xx network.

30. The method of claim 29, wherein the first network is an IEEE 802.16 network and the second network is an IEEE 802.11 network.

31. The method of claim 29, wherein the first network is an IEEE 802.11 network and the second network is an IEEE 802.16 network.

32. An access point (AP) comprising:
a media independent handover (MIH) device configured to produce handover information messages; and
an Institute of Electrical and Electronics Engineers (IEEE) 802.xx management entity (ME) device coupled to the MIH device, the IEEE 802.xx ME device coupled to an IEEE 802.xx medium access control (MAC) layer device and an IEEE 802.xx physical (PHY) layer device, the IEEE 802.xx ME device configured to process handover information messages produced by the MIH device; and
wherein the MIH device is further configured to communicate with the IEEE 802.xx MAC layer device and the IEEE 802.xx PHY layer device via the IEEE 802.xx ME device, and to send the handover information messages to another MIH device via the IEEE 802.xx ME device, wherein the IEEE 802.xx ME device comprises:
a MAC ME device configured to communicate with the IEEE 802.xx MAC layer device; and
a PHY ME device configured to communicate with the IEEE 802.xx PHY layer device;
wherein the MIH device is further configured to communicate with either the MAC ME device or the PHY ME device.

33. The access point of claim 32 wherein the access point is configured to initiate handover of a station from an IEEE 802.xx technology to a cellular technology in response to the information provided by the MIH device to facilitate handover.

34. The access point of claim 32 wherein the MIH device is configured to communicate with technologies other than IEEE 802.xx technologies.

35. The access point of claim 32 wherein the IEEE 802.xx is an IEEE 802.11 technology or an IEEE 802.16 technology.

36. The access point of claim 32 wherein the cellular technology is a Global System for Mobile communication (GSM), General Packet Radio Service (GPRS) or Third Generation (3G) technology.

37. The access point of claim 32 wherein the MIH device is configured as a sublayer between layer 2 and layer 3.

38. The access point of claim 32 wherein the MIH device is coupled to layer 3.

39. The access point of claim 32 wherein the MIH device further comprises a handover policy function configured to utilize the MIH information to facilitate handover for a handover decision.

40. The access point of claim 39 wherein the handover decision is made autonomously by the handover policy function.

41. A wireless station comprising:
a media independent handover (MIH) device configured to produce handover information messages; and
an Institute of Electrical and Electronics Engineers (IEEE) 802.xx medium access control (MAC) layer device and an IEEE 802.xx physical (PHY) layer device, and an IEEE 802.xx MAC management device and an IEEE 802.xx PHY management device;
wherein the MIH device is further configured to communicate with the IEEE 802.xx MAC layer device, the IEEE 802.xx MAC management device, and the IEEE 802.xx PHY management device, and to send the handover information messages to another MIH device.

42. The station of claim 41 wherein the media independent handover (MIH) device is further configured to transmit mobility protocol information and resource control protocol information.

43. The station of claim 41, wherein the MIH device is further configured to perform handover from a first network to a second network.

44. The station of claim 43, wherein the first network is a cellular network and the second network is an IEEE 802.xx network.

45. The station of claim 43, wherein the first network is an IEEE 802.xx network and the second network is a cellular network.

46. The station of claim 43, wherein the first network is an IEEE 802.xx network and the second network is an IEEE 802.xx network.

47. The station of claim 46, wherein the first network is an IEEE 802.16 network and the second network is an IEEE 802.11 network.

48. The station of claim 46, wherein the first network is an IEEE 802.11 network and the second network is an IEEE 802.16 network.

* * * * *

UNITED STATES PATENT AND TRADEMARK OFFICE
CERTIFICATE OF CORRECTION

| | | |
|---|---|---|
| PATENT NO. | : 7,933,245 B2 | Page 1 of 1 |
| APPLICATION NO. | : 11/463748 | |
| DATED | : April 26, 2011 | |
| INVENTOR(S) | : Alan Gerald Carlton | |

It is certified that error appears in the above-identified patent and that said Letters Patent is hereby corrected as shown below:

ON THE TITLE PAGE

At Section (56) U.S. PATENT DOCUMENTS, page 2, left column, after "7,106,714 B2 9/2006 Spear et al.", insert --7,149,524 12/2006 Reynolds--.

At Section (56) OTHER PUBLICATIONS, page 3, right column, after the words "Architecture (Stage 2) R1.0.2.", delete "Nov. 3, 2011" and insert --2004-11-03--.

At Section (56) OTHER PUBLICATIONS, page 3, right column, after the words "Jan. 10, 2004" delete "20" and insert --21--.

Signed and Sealed this
Fifth Day of July, 2011

David J. Kappos
*Director of the United States Patent and Trademark Office*